Patented Dec. 15, 1942

2,305,546

UNITED STATES PATENT OFFICE 2,305,546

DISINFECTANT

Vartkes Migrdichian, Greenwich, Conn., assignor to American Cyanamid Company, New York, N. Y., a corporation of Maine No Drawing. Application December 3, 1940, Serial No. 368,363

15 Claims. (Cl. 167—22)

The present invention relates to new disinfectants, and more particularly to certain organic mercury compounds which are especially effective against plant pests and microorganisms with the result that they may be used for all purposes of preserving and disinfecting, for example, the immunizing of seed grain, the prevention of mildew formation, the preservation of wood, in the preservation of glue and the like.

These new disinfectants comprise organic derivatives of mercury represented by the general formula:

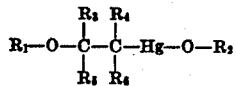

in which $R_1$ and $R_2$ denote alkyl or aralkyl radicals, and $R_3$, $R_4$, $R_5$ and $R_6$ denote hydrogen, alkyl, aryl, or aralkyl radicals.

In producing mercury compounds of this type, the acetate salts of said compounds are first prepared by the interaction of an alcohol such, for example, as methyl, ethyl, isopropyl, n-butyl, benzyl alcohol and the like, a compound containing an ethylenic linkage such, for example, as ethylene itself, propylene, isobutylene, styrene and the like, and mercuric acetate.

The acetates thus formed are converted by dilute hydrochloric acid or a sodium chloride solution to the corresponding chloride compounds, and by simple metathesis from the latter and a sodium alcoholate in alcoholic solution these new products may be readily obtained.

The reactions leading to the formation of ethoxyethyl mercury ethoxide, a typical example of the foregoing compounds, may be illustrated by the following equations:

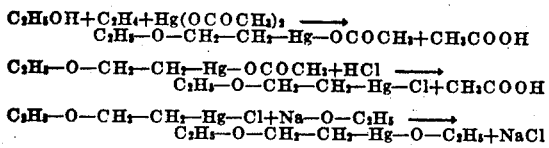

As showing the wide diversity of compounds which may be used for the purposes of this invention, the following may be mentioned: methoxyethyl mercury ethoxide, methoxyethyl mercury butoxide, methoxyethyl mercury benzyloxide, ethoxyethyl mercury methoxide, ethoxyethyl mercury ethoxide, ethoxyethyl mercury butoxide, ethoxyethyl mercury benzyloxide, isopropyloxyethyl mercury methoxide, isopropyloxyethyl mercury butoxide, n-butoxyethyl mercury ethoxide, n-butoxyethyl mercury butoxide, benzyloxyethyl mercury methoxide, benzyloxyethyl mercury butoxide, ethoxypropyl mercury ethoxide, ethoxypropyl mercury benzyloxide, methoxybutyl mercury ethoxide, isopropyloxybutyl mercury methoxide and ethoxyphenylethyl mercury methoxide.

The above class of mercury compounds possess high fungicidal power and have been found particularly valuable for use as dusting disinfectants in combating seed diseases. Excellent control of the fungus diseases of seed corn may be obtained with dust mixtures containing as low as one per cent of the active compound. Other plants whose seeds may be advantageously disinfected in accordance with this invention include rye, oats, barley, maize, wheat, peas, beans, potatoes, etc.

These new disinfectants are also highly efficacious against plant pests and microorganisms, such as insects, bacteria, moulds and the like, with the result that they may be employed for all purposes of preserving or disinfecting, for example, the immunizing of seeds, the preservation of wood, the prevention of mildew formation, in the preservation of glue, in insecticidal compositions and the like.

The invention is further illustrated by the following examples:

Example 1

A dust consisting of one part by weight of the compound, ethoxyethyl mercury ethoxide

and 99 parts by weight of talc is dusted onto seed corn, infected by Fusarium, in the proportion of 1.5 ounces of dust to one bushel of corn. Germination of the fungi spores is averted.

Example 2

Benzyloxyethyl mercury butoxide of the formula:

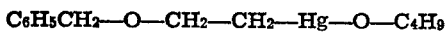

is used in a manner similar to the procedure of Example 1.

Example 3

Reid's Yellow Dent seed corn, Diplodia infected, is dusted in the ratio of 1000 to 16 with an immunizing agent consisting of 99 parts by weight of talc and one part by weight of methoxyethyl mercury benzyloxide of the formula:

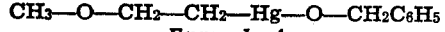

Example 4

One gram of dust consisting of 97 parts by weight of talc and 3 parts by weight of the mercury compound, isopropyloxyethyl mercury methoxide

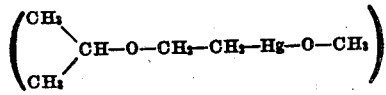

is placed in a stoppered four-ounce bottle. Fifty corn seeds, Gibberella infected, held in a sack suspended in the bottle, are exposed to the vapors of the mercury compound for one week. Upon germination of the exposed seeds it is found that the germination of fungi spores is prevented.

*Example 5*

Methoxyethyl mercury ethoxide of the formula:

is used in a manner similar to the procedure of Example 4.

It is to be understood that the foregoing examples are merely illustrative and that this invention may be applied to the wide variety of organic compounds represented by the general formula given. Also, it is believed that the mercury compounds herein disclosed and the methods of producing the same are not formerly known.

Although these mercury compounds may be used alone, it is usually preferable to mix them with inert fillers or spreading materials such as talc, bentonite, kieselguhr, fuller's earth, pumice, silica, silicates, chalk, etc. These inert materials are preferably in a finely divided state, as are the mercury compounds, and mixtures of the ingredients are easily prepared in any well-known manner. The proportions of the ingredients in the finished dust may be varied widely in accordance with the particular effects desired and the conditions under which they are to be used. Under some circumstances it may be desirable and feasible to apply the present compounds in the form of solutions or suspensions in water or other liquid, and the present invention does not preclude such use.

While the invention has been described with particular reference to specific embodiments, it is to be understood that it is not to be limited thereto but is to be construed broadly and restricted solely by the scope of the appended claims.

I claim:

1. The method of protecting organic material subject to attack by plant pests and microorganisms which comprises treating the said materials with an organic mercury compound of the general formula:

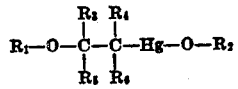

in which $R_1$ and $R_2$ are selected from the group consisting of alkyl and aralkyl radicals, and $R_3$, $R_4$, $R_5$ and $R_6$ are selected from the group consisting of hydrogen, alkyl, aryl and aralkyl radicals.

2. The method of protecting organic materials subject to attack by plant pests and microorganisms which comprises treating the said materials with an organic mercury compound of the general formula:

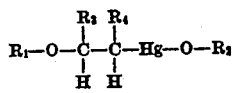

in which $R_1$ and $R_2$ are selected from the group consisting of alkyl and aralkyl radicals, and $R_3$ and $R_4$ are selected from the group consisting of hydrogen, alkyl, aryl and aralkyl radicals.

3. The method of protecting organic materials subject to attack by plant pests and microorganisms which comprises treating the said materials with an organic mercury compound of the general formula:

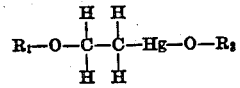

in which $R_1$ and $R_2$ are selected from the group consisting of alkyl and aralkyl radicals.

4. The method of protecting organic materials subject to attack by plant pests and microorganisms which comprises treating the said materials with an organic mercury compound of the general formula:

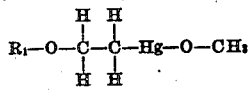

in which $R_1$ is selected from the group consisting of alkyl and aralkyl radicals.

5. The method of protecting organic materials subject to attack by plant pests and microorganisms which comprises treating the said materials with an organic mercury compound of the general formula:

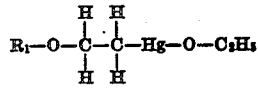

in which $R_1$ is selected from the group consisting of alkyl and aralkyl radicals.

6. The method of protecting organic materials subject to attack by plant pests and microorganisms which comprises treating the said materials with an organic mercury compound of the general formula:

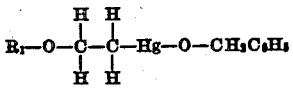

in which $R_1$ is selected from the group consisting of alkyl and aralkyl radicals.

7. The method of immunizing seed which comprises treating said seed with an organic mercury compound of the general formula:

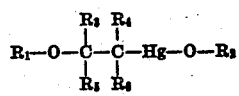

in which $R_1$ and $R_2$ are selected from the group consisting of alkyl and aralkyl radicals, and $R_3$, $R_4$, $R_5$ and $R_6$ are selected from the group consisting of hydrogen, alkyl, aryl and aralkyl radicals.

8. The method of immunizing seed which comprises treating said seed with an organic mercury compound of the general formula:

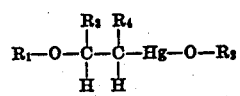

in which $R_1$ and $R_2$ are selected from the group consisting of alkyl and aralkyl radicals, and $R_3$ and $R_4$ are selected from the group consisting of hydrogen, alkyl, aryl and aralkyl radicals.

9. The method of immunizing seed which comprises treating said seed with an organic mercury compound of the general formula:

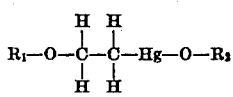

in which $R_1$ and $R_2$ are selected from the group consisting of alkyl and aralkyl radicals.

10. The method of immunizing seed which comprises treating said seed with an organic mercury compound of the general formula:

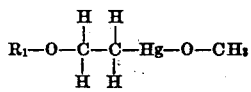

in which $R_1$ is selected from the group consisting of alkyl and aralkyl radicals.

11. The method of immunizing seed which comprises treating said seed with an organic mercury compound of the general formula:

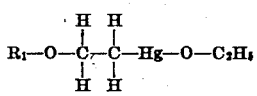

in which $R_1$ is selected from the group consisting of alkyl and aralkyl radicals.

12. The method of immunizing seed which comprises treating said seed with an organic mercury compound of the general formula:

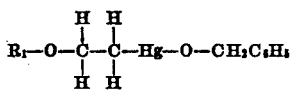

in which $R_1$ is selected from the group consisting of alkyl and aralkyl radicals.

13. The method of immunizing seed which comprises treating said seed with an organic mercury compound of the formula:

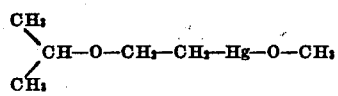

14. The method of immunizing seed which comprises treating said seed with an organic mercury compound of the formula:

15. The method of immunizing seed which comprises treating said seed with an organic mercury compound of the formula:

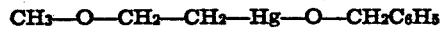

VARTKES MIGRDICHIAN.